Sept. 18, 1923.

H. THOMASON

VEHICLE WHEEL REMOVER

Filed Feb. 16, 1921

INVENTOR.
Hjalmar Thomason
BY Raymond Ives Blakeslee
ATTORNEY.

Sept. 18, 1923.

H. THOMASON 1,468,334

VEHICLE WHEEL REMOVER

Filed Feb. 16, 1921     2 Sheets-Sheet 2

INVENTOR.
Hjalmar Thomason
BY Raymond Jas Blakele
ATTORNEY

Patented Sept. 18, 1923.

1,468,334

UNITED STATES PATENT OFFICE.

HJALMAR THOMASON, OF LOS ANGELES, CALIFORNIA, ASSIGNOR TO SHEPARD-THOMASON CO., OF LOS ANGELES, CALIFORNIA, A CO-PARTNERSHIP.

VEHICLE-WHEEL REMOVER.

Application filed February 16, 1921. Serial No. 445,480.

*To all whom it may concern:*

Be it known that I, HJALMAR THOMASON, a subject of the King of Sweden, residing at Los Angeles, in the county of Los Angeles and State of California, have invented new and useful Improvements in Vehicle-Wheel Removers, of which the following is a specification.

This invention relates to a wrench and more particularly to a vehicle wheel remover.

The invention has for an object the provision of a device of this character which will remove a wheel from a vehicle in a minimum of time, and without undue effort on the part of the operator thereof.

It is an acknowledged fact that the removing of a vehicle wheel from an automobile axle is a difficult feat. This is particularly true in case the rear wheel of the automobile happens to have a full floating rear axle. After a wheel has been run for considerable time, the hub of the same becomes wedged in such a manner that a removal of the wheel sometimes requires as long as two days' time. However, with this device, only a few minutes would be consumed in this hitherto difficult feat. While the tool is particularly adaptable for the purpose just stated, yet the tool is adaptable for a variety of other purposes, such as removing parts from shafts, etc.

In practicing the invention, I provide a ring or annular frame member having its inner face beveled and upon said beveled face a correspondingly beveled member is adapted to be carried. This latter member is in the form of a split ring or bushing and is provided with threads on its inner face. The first mentioned ring member has means passing through the same for engagement with the walls surrounding the split portion of the inner ring member, whereby a turning of said means will clamp said ring member in position. The outer ring member is flanged at an edge thereof to compensate for the difference in the material caused by beveling said member, so that the strength throughout the member will be the same. Upon the flanged face of said member is formed a diametrically disposed bracket, yoke, stirrup or U-shaped member. This U-shaped member is formed with an intermediate portion adapted to carry a screw-threaded member. A handle member is likewise joined with said U-shaped member so that the entire device may be easily revolved when upon some object. Assuming now that it is desired to remove a vehicle wheel from an axle, the cap and nut are removed from said vehicle wheel, and the tool just described is screwed upon the threaded portion of said wheel. When this has been done, a turning of the screw-threaded member carried by the U-shaped member will engage an end of the axle and the pressure interposed between the end of this member with the axle will exert an outward pressure upon the wheel member, as of course would be obvious. This pressure will remove the wheel from the axle.

The tool has various refinements whereby various split rings may be placed within the outer ring member so that wheels having different sized cap ends may be removed, this feature rendering the tool or device universal in its application. If desired, the tool may have various adjustable grab hooks joined to the same, so that it may be used in various ways. These latter features will be more fully described in the detailed description.

The invention has for further objects the provision of an improved wrench which will be superior in point of relative simplicity and inexpensiveness, taken in conjunction with utility, durability and general efficiency and serviceability.

With the above mentioned and other objects in view, the invention consists in the novel and useful provision, formation, construction, combination, association and interrelation of parts, members and features, as illustrated in some of its embodiments in the accompanying drawings, described in the following detailed description and finally pointed out in claims.

In the drawings.

Corresponding parts in all the figures are designated by the same reference characters.

Figure 2:
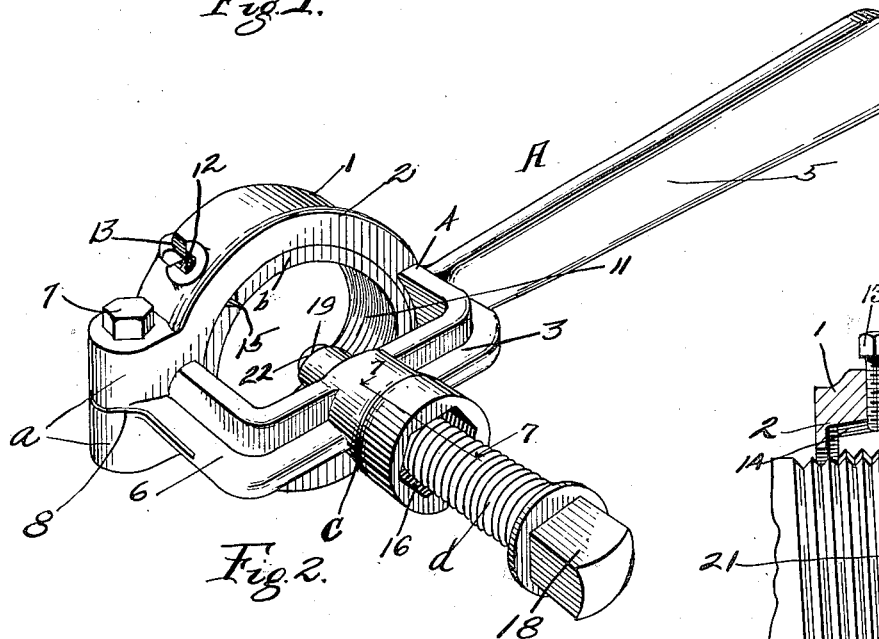
Figure 2 is a perspective view of the tool in one of its embodiments.
Figure 6:
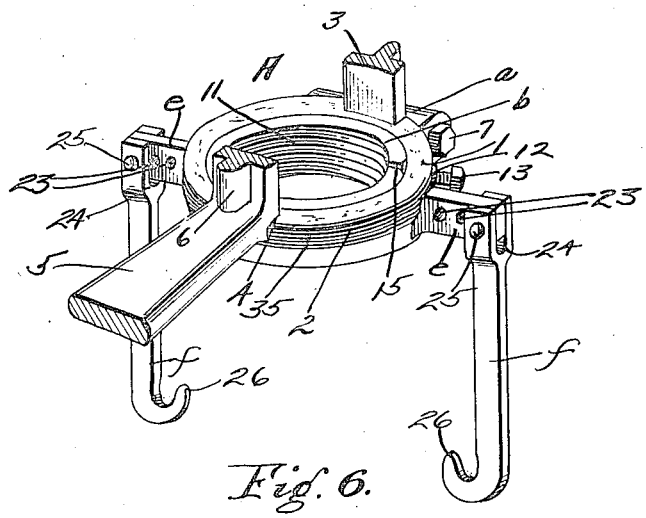
Figure 6 is a perspective view of a modification of the tool shown in Figure 2.

Referring with particularity to the drawings, wherein the improved wrench or vehicle wheel remover is designated in its entirety by A, Figure 2 of the drawings illustrates one embodiment of the improved wrench while Figure 6 shows another embodiment of said wrench.

The improved wrench A shown in Figure 2 may include a frame member 1, annular in its formation. One edge of said frame member 1 is flanged as shown at 2, and to the face of the member 1, which carries the flanged portion, is joined a cross-piece or bracket 3, which cross-piece is stirrup-like, yoke-like, or U-shaped in formation. Also joined with the periphery of the member 1 as at 4 is a handle member 5. In the figures the handle member is shown as being integrally formed with the member 3. The member 3 is provided with a central flange 6 for strengthening purposes and the outer peripheral surface of the frame member 1 is formed with a projecting member $a$, which is tapped for the reception of a threaded screw 7. The frame member 1, which as stated is annular in formation, as well as the member $a$, is transversely split as at 8. Thus by turning the threaded screw 7 the inner diameter of the inner span of the frame member 1 may be varied to a slight extent.

Figure 4:
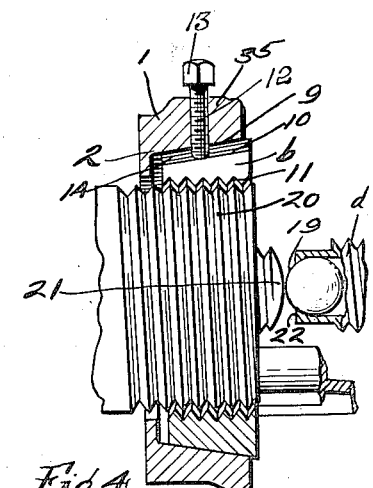
Figure 4 is a fragmentary cross-sectional view showing the ring member loosely engaging the threaded hub portion of a vehicle wheel.
Figure 5:
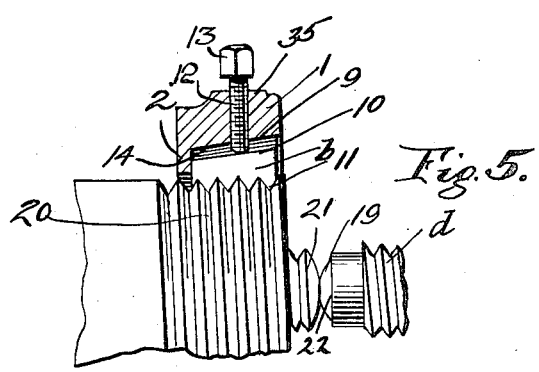
Figure 5 shows the result of application of pressure against the end of the axle member, causing the threaded portion of the ring member to firmly engage the hub threads of the vehicle wheel.

Referring to Figures 4 and 5, wherein it will be seen that the frame member 1 has its inner surface beveled as shown at 9; said beveled portion being convergently directed outwardly from the flange 2.

Figure 3:
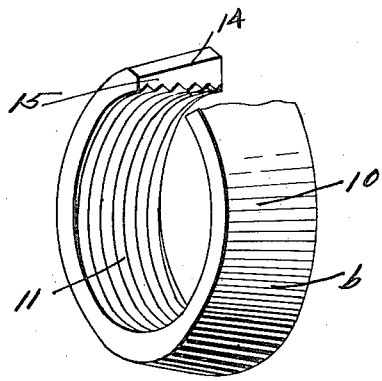
Figure 3 is a perspective view of a ring member used in conjunction with the tool in practicing one embodiment of the invention.

A split annular ring or bushing shown in Figure 3, and designated as $b$, is adapted to fit within the frame member 1 as shown in the figures. The split annular ring $b$ has its peripheral surface beveled as shown at 10, and the beveled surface of the ring $b$ cooperates with the beveled surface 9 of the frame 1. The inner surface of the ring $b$ is screw-threaded as shown at 11. In order to maintain the member $b$ within the frame member 1, the frame member 1 is transversely tapped as shown at 12 and a screw-threaded bolt 13 passes through said tapped portion and is adapted to engage with the beveled faces 14 surrounding the split portion 15 of the member $b$, as is clearly shown in Figures 4 and 5. Obviously a turning of the bolt member 7 within the threaded portion of the member $a$ will likewise tend to grip the member $b$.

Figures 7, 8:
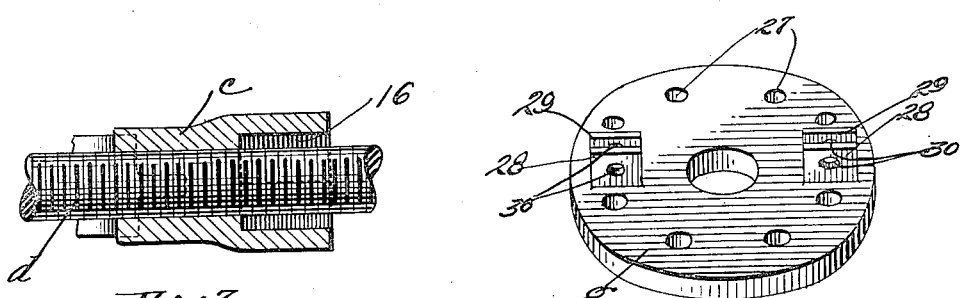
Figure 7 is a fragmentary cross-sectional view on the line 7—7, Figure 2, and looking in the direction of the appended arrows.
Figure 8 is a perspective view of a plate member adapted to be utilized with the improved tool, for the removal of wheels upon automobiles which have a full floating rear axle.

Centrally disposed on the member 3 is a bolt carrying member $c$. In Figure 7, which is a cross-section of said bolt carrying member $c$, it will be noted that the bolt carrying member is tapped for the reception of a screw member $d$. A portion extending inwardly from the outer end 15 of the member $c$ is provided with a polygonal bore 16 surrounding the bolt $d$. This latter portion is adapted to confine the heads of bolts when the member $d$ is removed from the member $c$.

Figure 1:
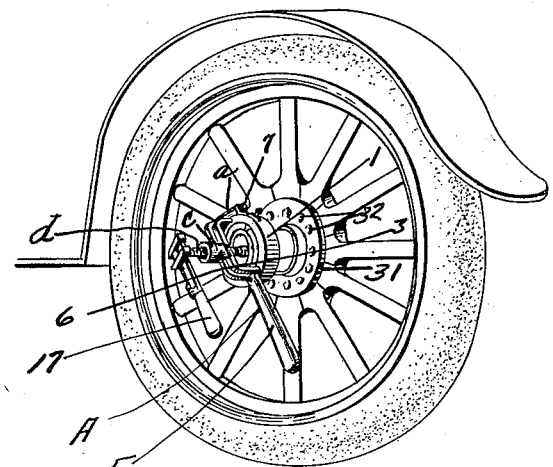
Figure 1 is a fragmentary perspective view showing the improved tool about to remove a wheel from the axle of an automobile.

In using the tool just described, and referring to Figure 1, the hub-cap is removed from the wheel and the tool A is screwed on to the portion formerly occupied by the hub-cap. A turning of the bolt $d$ by placing for instance a wrench 17 on the head 18 of the same will cause the inner end as 19 of said bolt to engage an end of the axle member and thus exert a pressure against the same as shown in Figure 5. When this occurs the threaded portion 11 of the member $b$, if it does not happen to fit upon the threaded portion 20 formerly holding the hub-cap, will do so when there is a pressure between end 19 and the end of the axle 21, as shown in Figure 5; the pressure between ends 19 and 21 causing the member $b$ to slide along the inclined or beveled face 9 and in so doing to change the diameter of the member $b$ sufficiently so that its threads 11 will engage the threads 20.

In order to reduce friction between ends 19 and 21 the screw $d$ is provided with a chambered portion, which chambered portion confines a ball member 22.

The modification of the tool which is shown in Figure 6 has two diametrically opposed outstanding lug members $e$ joined with the outer surface of the frame member 1. Said lug members are provided with a plurality of transverse perforations 23. These lugs may be used for a variety of purposes, such as maintaining hook members $f$. Said hook members $f$ would be bifurcated at one end as at 24 so as to straddle opposite sides of the lugs, and a pin member 25 then passed through aligned perforations in the bifurcated portions 24 and through a perforation 23 in the lug members. The opposite end of the hook members $f$ would of course each be provided with a returned portion 26 constituting a hook. A tool of this character might be used in removing a wheel by having the hook portions of the members $f$ engaging spokes of a wheel, or they might be used for lifting various parts or castings in the engine and for a variety of other purposes which will suggest themselves to the user of the tool.

In Figure 8 is shown an annular plate member $g$ provided with a plurality of circularly arranged and spaced transverse perforations 27. The plate member $g$ is likewise provided with two up-standing diametrically opposed and spaced bifurcated members 28 and 29, having transverse aligned perforations 30 therein. The plate member shown in Figure 8 is particularly useful in the removal of rear wheels of motor vehicles when the motor vehicle is provided with a full floating rear axle. Assuming that the wheel shown, for purpose of illustration in Figure 1, was a vehicle having a full floating rear axle, the wheel flange 31 would be removed from said wheel by removing the nuts 32 from the bolts holding said flange. The axle would then be removed and the plate $g$ would be bolted to the flange bolts by arranging the bolt members to pass through the perforations 27 of the plate $g$ and then replacing sufficient of the nuts to bolt on the same. The tool A, which is provided with the outstanding lugs $e$, would then engage each bifurcated member 28 and 29 and a pin 33 would be passed through the perforations 30 and one of the perforations 23 in each of the lug members $e$.

Figure 9:
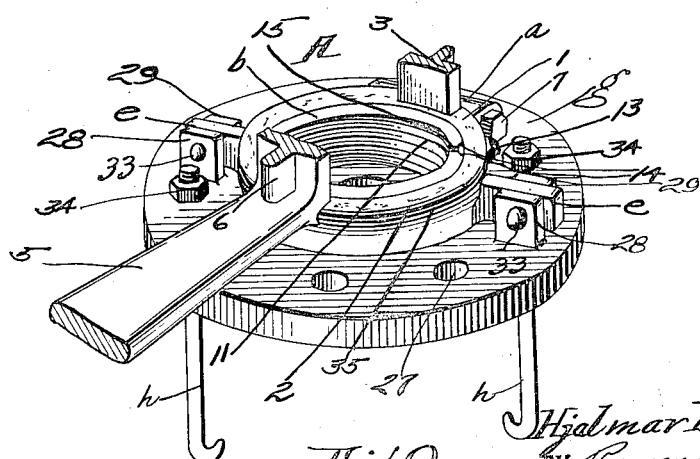
Figure 9 is an application of the device shown in Figure 8, to the improved tool shown in Figure 2.

In Figure 9 members $h$ have been passed through certain of the perforations 27 of the member $g$ and maintained on position by means of nuts 34 having a screw-threaded engagement with the members $h$. The member $g$ might be used on timing gears and for a variety of purposes.

As will be readily observed in the various figures, notably in Figure 6, the peripheral surface of the member 1 is progressively flanged as shown at 35 so as to compensate for the beveled inner face of said member 1. This is done, as was stated in the first part of this specification, in order that the member 1 would be of equal strength throughout its structure.

It is obvious that many changes and variations may be made in departure from the particular description and showing of the accompanying drawings in adapting the invention to various conditions and requirements of use and service, without departing from the true spirit of the invention.

Having described my invention, what I claim and desire to secure by Letters Patent is:

1. A device of the character described, comprising an annular frame member, a bracket member, upon one face of said frame member, bridging the annular gap thereof, and a handle member joined with said frame member and bracket member; there being means carried by said annular frame member adapted to have a screw-threaded engagement with the hub threads of a vehicle wheel, and means centrally carried by the bracket member and adapted to engage the member upon which said wheel is mounted, whereby a pressure may be exerted between the said member and the wheel for removing the wheel from said member.

2. A device of the character described, comprising an annular frame member, a bracket member, upon one face of said frame member, bridging the annular gap thereof, and a handle member joined with said frame member and bracket member; there being means carried by said annular frame member adapted to have a screw-threaded engagement with the hub threads of a vehicle wheel, and means centrally carried by the bracket member and adapted to engage the member upon which said wheel is mounted, whereby a pressure may be exerted between the said member and the wheel for removing the wheel from said member; said means carried by the annular frame member comprising an internally threaded bushing.

3. A device of the character described, comprising an annular frame member, a bracket member, upon one face of same frame member, bridging the annular gap thereof, and a handle member joined with said frame member and bracket member; there being means carried by said annular frame member adapted to have a screw-threaded engagement with the hub threads of a vehicle wheel, and means centrally carried by the bracket member and adapted to engage the member upon which said wheel is mounted, whereby a pressure may be exerted between the said member and the wheel for removing the wheel from said member; said annular frame member being flanged on the face which carries the bracket member, and the inner peripheral surface of said frame member being outwardly divergently beveled from said flanged member; and the said means carried by said annular frame member comprising a bushing transversely split and having its outer peripheral surface beveled for cooperation with the beveled portion of the frame member, there being means passing through said frame member for engagement with the walls surrounding the transversely split portion of the bushing for locking said bushing with the frame member.

4. A device of the character described, comprising an annular frame member, and a bracket member, upon one face of same frame member, bridging the annular gap thereof; said annular frame member and said bracket member being transversely split for a portion, there being means carried by said annular frame member for varying the gap of said split portion, and whereby the diameter of said annular frame member is correspondingly varied; there being means carried by said annular frame member and adapted to have a screw-threaded engagement with the hub threads of a vehicle wheel, and means centrally carried by the bracket member and adapted to engage a member of the vehicle whereby a pressure may be exerted for removing the wheel from the vehicle.

5. A device for removing a vehicle wheel from an axle, including a member for engagement with a portion of the wheel, and a member carried by the first member and adapted to engage the axle; said first member comprising an annular frame member, and a bushing member carried by the frame member; said bushing member being formed with a transverse split portion whereby the bushing is adjustable circumferentially within said frame to positions of greater or less diameter.

6. A device of the character described, comprising an annular frame member, a bushing member received within said frame member, said bushing being screw-threaded for engagement with hub threads of a vehicle wheel; a second member carried by the frame member for engagement with the axle upon which the vehicle wheel is mounted, whereby a pressure may be exerted between said member and the wheel for removing the wheel from said member; said bushing being formed with a transverse split portion and having its periphery beveled whereby pressure exerted between the wheel and axle will cause the bushing to closely grip the threads of the axle by wedging within the frame member.

In testimony whereof I have signed my name to this specification in the presence of two subscribing witnesses.

HJALMAR THOMASON.

Witnesses:
MILDRED LEACH,
JENNIE SHUTT.